(12) United States Patent
Hong

(10) Patent No.: US 9,719,482 B2
(45) Date of Patent: Aug. 1, 2017

(54) ONSHORE HYDROELECTRIC POWER GENERATION DEVICE

(71) Applicant: TZOO YING Enterprise Co., Ltd., Kaohsiung (TW)

(72) Inventor: Rong-Tai Hong, Kaohsiung (TW)

(73) Assignee: TZOO YING ENTERPRISE CO., LTD., Kaohsiung (TW)

( * ) Notice: Subject to any disclaimer, the term of this patent is extended or adjusted under 35 U.S.C. 154(b) by 0 days.

(21) Appl. No.: 14/987,532

(22) Filed: Jan. 4, 2016

(65) Prior Publication Data

US 2016/0201639 A1    Jul. 14, 2016

(30) Foreign Application Priority Data

Jan. 13, 2015 (CN) .......................... 2015 1 0015369

(51) Int. Cl.
| | |
|---|---|
| *F03B 7/00* | (2006.01) |
| *F03B 13/00* | (2006.01) |
| *F03B 17/06* | (2006.01) |
| *H02K 7/116* | (2006.01) |
| *H02K 7/18* | (2006.01) |

(52) U.S. Cl.
CPC ................ *F03B 7/00* (2013.01); *F03B 13/00* (2013.01); *F03B 17/063* (2013.01); *H02K 7/1163* (2013.01); *H02K 7/1823* (2013.01); *F05B 2260/4031* (2013.01); *Y02E 10/223* (2013.01); *Y02E 10/28* (2013.01)

(58) Field of Classification Search
CPC .... F03B 7/00; F03B 13/00; F05B 2260/4031; H02K 7/1823; H02K 7/1163; Y02E 10/28
See application file for complete search history.

(56) References Cited

U.S. PATENT DOCUMENTS

| | | | | | |
|---|---|---|---|---|---|
| 1,855,425 | A | * | 4/1932 | Sorenson | F03B 17/064 12/142 RS |
| 3,993,913 | A | * | 11/1976 | Dickman | E02B 9/08 290/53 |
| 4,053,787 | A | * | 10/1977 | Diggs | F03B 7/00 290/43 |
| 4,636,141 | A | * | 1/1987 | Sedlacek | F03B 17/063 290/43 |
| 5,430,332 | A | * | 7/1995 | Dunn, Jr. | F03B 7/00 290/43 |
| 5,882,143 | A | * | 3/1999 | Williams, Jr. | E02B 9/00 290/53 |
| 8,058,741 | B1 | * | 11/2011 | Echemendia | F03B 7/00 290/53 |
| 9,309,861 | B1 | * | 4/2016 | Gaul | F03B 13/22 |

(Continued)

FOREIGN PATENT DOCUMENTS

TW            325821 U     1/1998

*Primary Examiner* — Viet Nguyen
*Assistant Examiner* — Joseph Ortega
(74) *Attorney, Agent, or Firm* — Muncy, Geissler, Olds & Lowe, P.C.

(57) ABSTRACT

An onshore hydroelectric power generation device is disposed above a flow to obtain and convert the energy of flow into electricity, comprising a body unit, a water wheel unit, a mobile energy transmitting unit, and an electricity power generating unit. The kinetic energy of the flow is obtained by the water wheel unit, and is transmitted to the power generation unit adapted to the height of water level by the mobile energy transmitting unit.

4 Claims, 7 Drawing Sheets

(56) References Cited

U.S. PATENT DOCUMENTS

| | | | |
|---|---|---|---|
| 2005/0029817 A1* | 2/2005 | Gizara | F03B 17/061 290/43 |
| 2006/0131890 A1* | 6/2006 | Gizara | F03B 17/065 290/43 |
| 2006/0245919 A1* | 11/2006 | Krizik | F03B 7/00 415/202 |
| 2008/0231054 A1* | 9/2008 | Estefen | F03B 3/00 290/53 |
| 2008/0246280 A1* | 10/2008 | Lu | F03B 7/00 290/42 |
| 2010/0237625 A1* | 9/2010 | Dempster | F03B 7/00 290/54 |
| 2011/0115231 A1* | 5/2011 | Mulye | F03B 17/064 290/54 |
| 2011/0179787 A1* | 7/2011 | Griffin | F03B 7/00 60/639 |
| 2011/0299988 A1* | 12/2011 | Riegerbauer | F03B 7/00 416/178 |
| 2011/0316280 A1* | 12/2011 | Khesali | F03B 13/1815 290/53 |
| 2012/0112462 A1* | 5/2012 | Bado | F03B 13/1825 290/53 |
| 2013/0069369 A1* | 3/2013 | Salehpoor | F03B 7/00 290/53 |
| 2013/0088015 A1* | 4/2013 | Walton | F03B 1/00 290/54 |
| 2013/0229014 A1* | 9/2013 | Willingham | F03B 17/063 290/54 |
| 2013/0257057 A1* | 10/2013 | Legacy | F03B 13/08 290/52 |
| 2014/0110943 A1* | 4/2014 | Tagansky | E02B 9/08 290/53 |
| 2014/0159366 A1* | 6/2014 | Figueroa Nunez | F03B 17/063 290/43 |
| 2014/0241855 A1* | 8/2014 | Han | F03B 17/06 415/60 |
| 2014/0265335 A1* | 9/2014 | Andreis | B63B 1/32 290/52 |
| 2016/0025063 A1* | 1/2016 | Doronin | E02B 9/00 290/1 A |
| 2016/0141986 A1* | 5/2016 | Bergman | F03B 7/003 290/43 |

\* cited by examiner

ONSHORE HYDROELECTRIC POWER GENERATION DEVICE

BACKGROUND OF THE INVENTION a) Field of the Invention

The present invention relates to an onshore electricity power generation device, and more particularly to an onshore hydroelectric power generation device by which the energy of flowing water is transmitted to a generator adapting to the height of water level.

b) Description of the Related Art

Hydroelectric power is one of renewable energies and has a long history, its output is few but clean, so the flowing water is widely used by many power generation devices and develops into different generating methods, such as dams, run-off river, combination type, tide, pumped-storage and so on.

Please refer to FIG. 1, which concerns Taiwan Invention Patent No. 325821, entitled "Simple Electricity Power Generation Device", in which the whole device is buoyed up on water by tube 16, and is fixed to avoid being washed away by flowing water. The turbine wheel 14 is rotated by obtaining the energy of the flowing water, and the energy of the turbine wheel 14 is transmitted to the roller 21 of the generator 20 by two sets of chain 18 and chain wheel 17, so the electricity generated by the generator 20 can be directed to onshore socket 22 by wires.

From the above descriptions, certain problems still exist in the prior art device:

1. Less Improvement of Output

The overload of the buoyed generator set is limited by the floater, and to avoid being overturned by water, the volume of the generator is also limited, so the output cannot be improved.

2. Low Durability

The chains and gear wheels are used to transmit energy in the prior art device, the chain wheels are worn by the chains when rotating, and wear becomes worst when dusts in the air fall into the chains, so frequent maintenance is necessary.

3. Easily Damaged

The electricity power transmitting wires are disposed in the river course, so they are easy to get damaged by collision resulted from river objects. Moreover, the buoyed electricity power generation device is easy to get damaged by vapor-phase oxidation.

From the above descriptions, although the buoyed electricity power generation device can generate electricity, its output cannot be improved and it is easy to get damaged by river flushing. Therefore, improvements are desirable to be obtained.

SUMMARY OF THE INVENTION

Therefore, an objective of an embodiment of the present invention is to provide an onshore hydroelectric power generation device, which is disposed above a flow to obtain and convert the energy of the flow into electricity power, comprising a body unit, a water wheel unit, a mobile energy transmitting unit, and an electricity power generating unit.

The body unit comprises a platform disposed above the flow at in a distance and a holder disposed on the platform. The water wheel unit comprises a supporting set, a water wheel set coupled to the supporting set, and a floating set coupled to the supporting set and disposed below the water wheel set. The floating set is buoyed up on water and its position is changed with the height of water level, so the height of the water wheel set can be supported, and the water wheel set is turned to rotate by the contact between the flow and water wheel set. The mobile energy transmitting unit is coupled to the water wheel set, and is adapted to the position of water wheel set, so that the power of the flow is transmitted. The electricity power generating unit comprises a generator disposed on the platform and coupled to the mobile energy transmitting unit, and the kinetic energy of the mobile energy transmitting unit can be obtained, so that electricity power can be generated.

An advantage of embodiments of the invention is that the floating set is adapted to the water level, so that the water wheel set can keep contacting the flow. In addition, the supporting set is extended at an angle following the direction of the flow, so that the water wheel blades are rotated. Furthermore, the mobile energy transmitting unit is adapted to the height of water level to transmit the energy to the generating unit for generating electricity.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
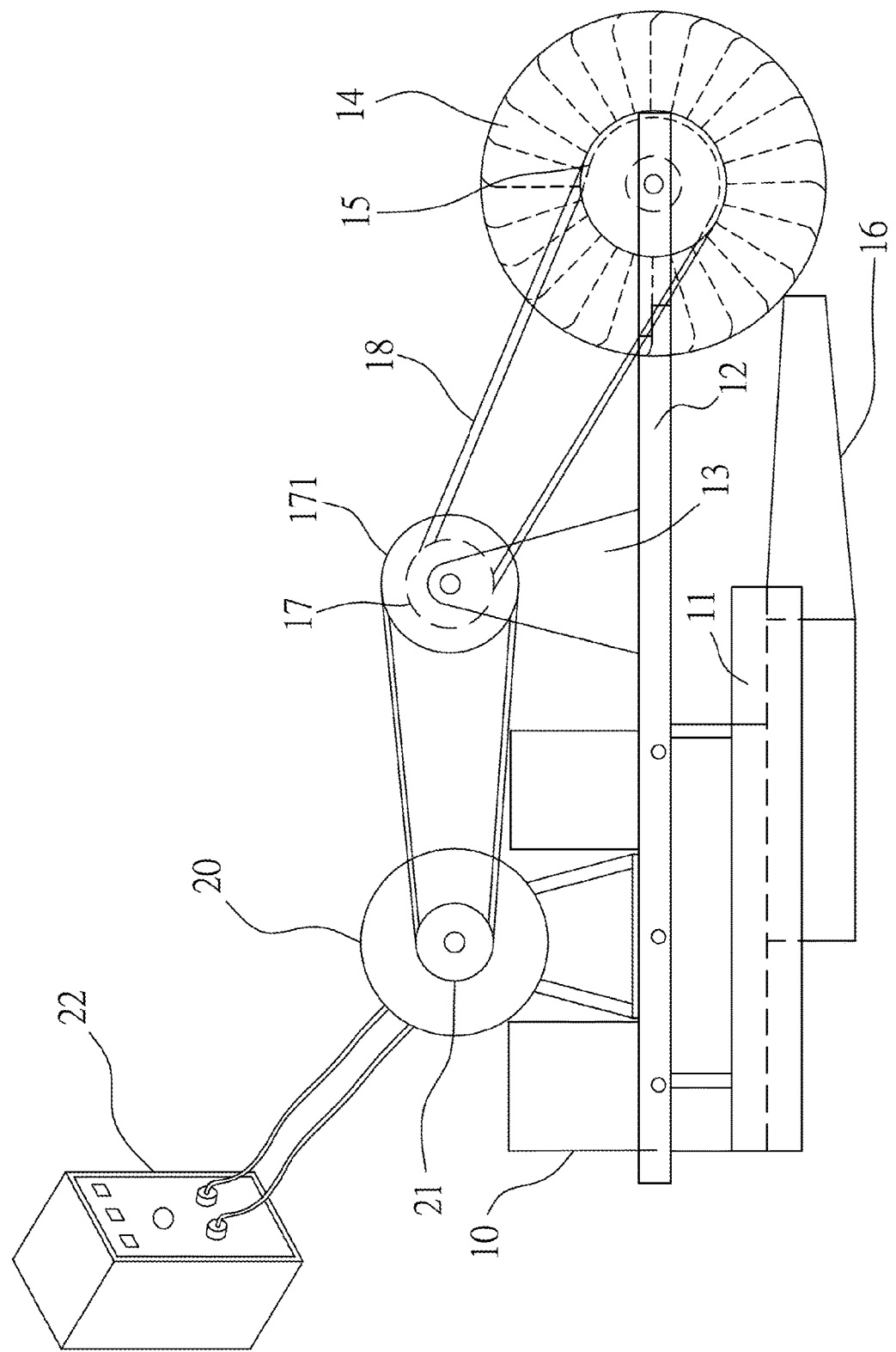
FIG. 1 is an arrangement of a prior art device disclosed in Taiwan Invention Patent No. 325821.
Figure 2:
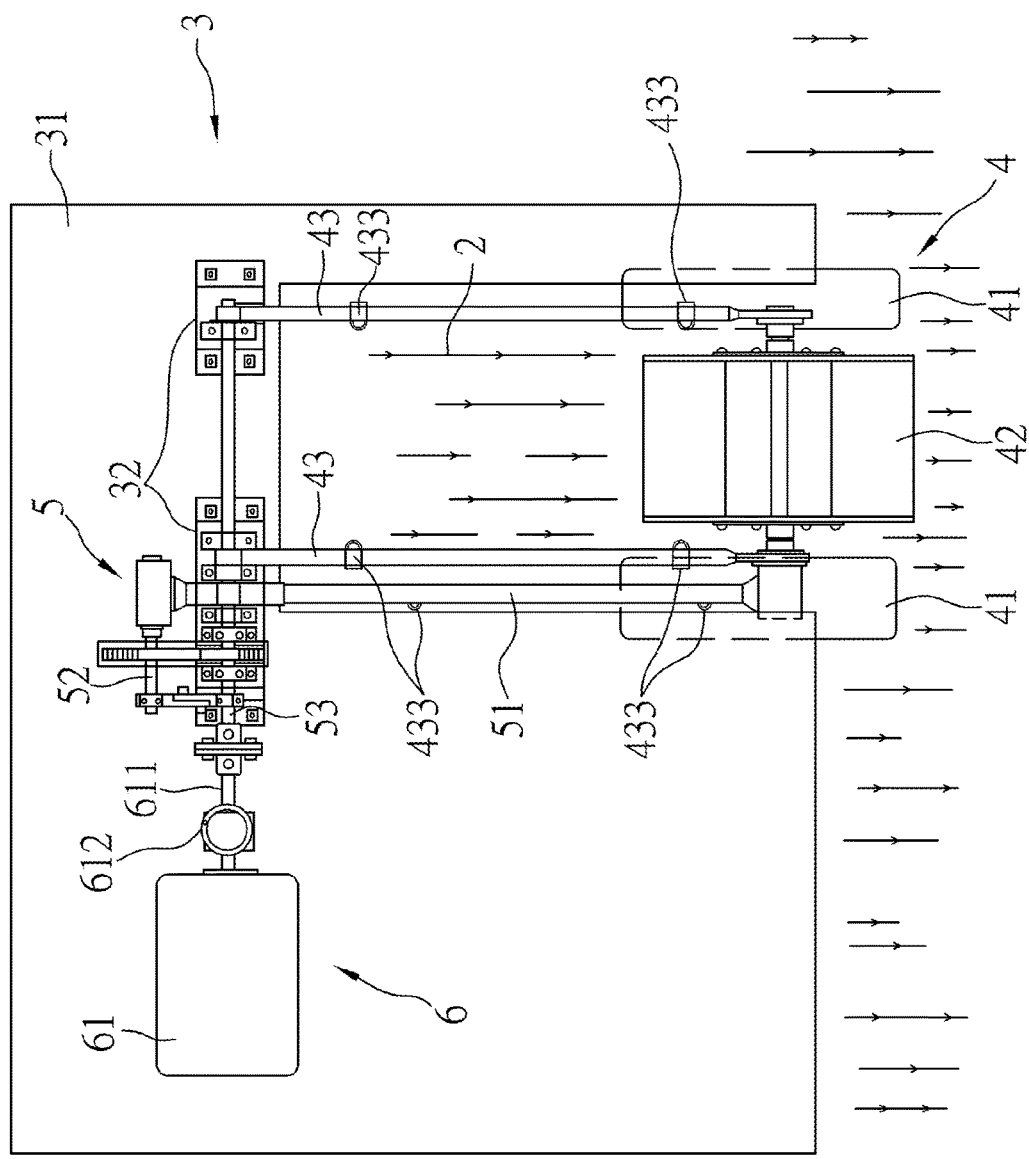
FIG. 2 is a top view supporting to depict a first preferred embodiment device according to an embodiment of the present invention.
Figure 3:
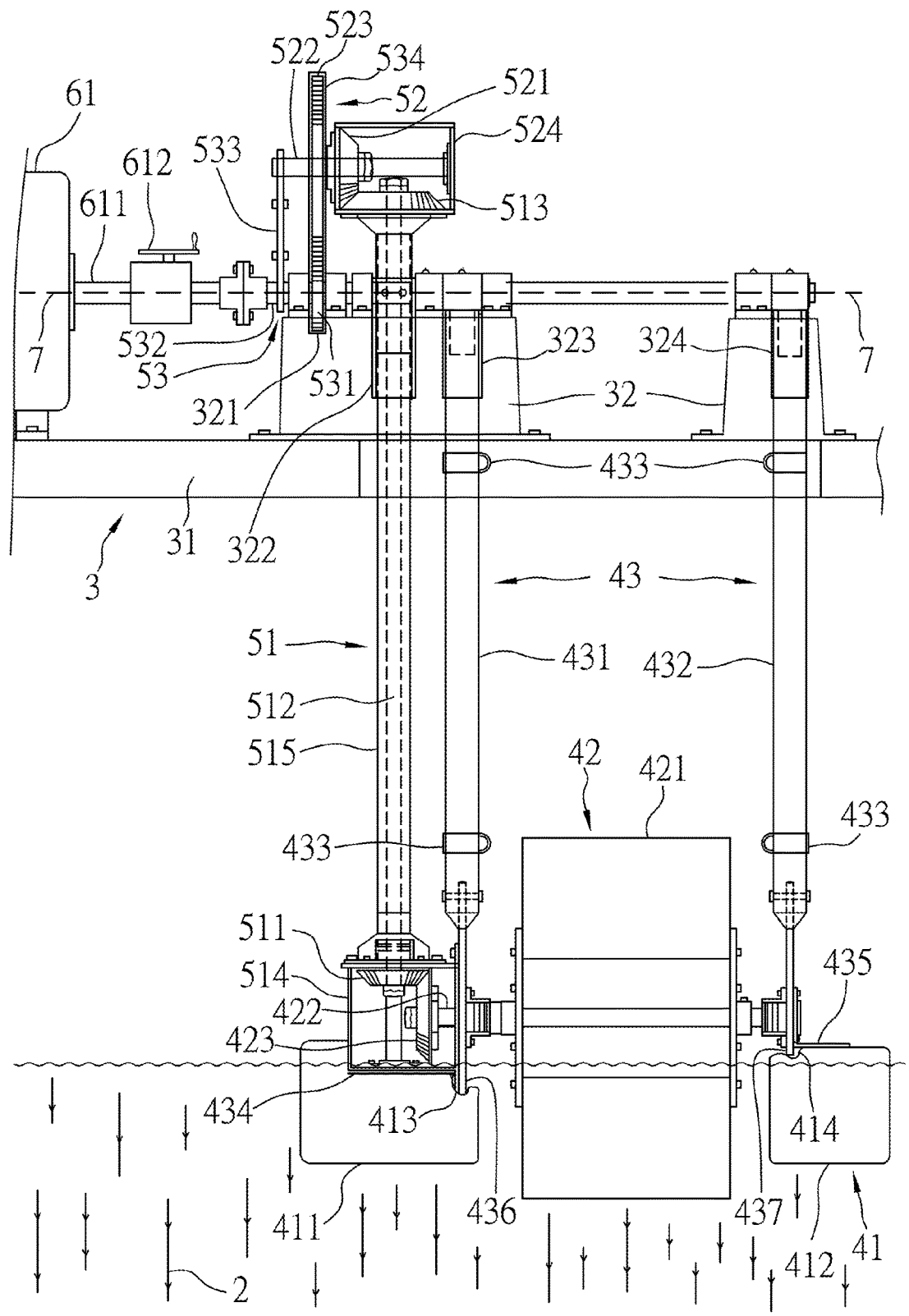
FIG. 3 is a front view depicting an interior layout of a first preferred embodiment device according to an embodiment of the present invention.
Figure 4:
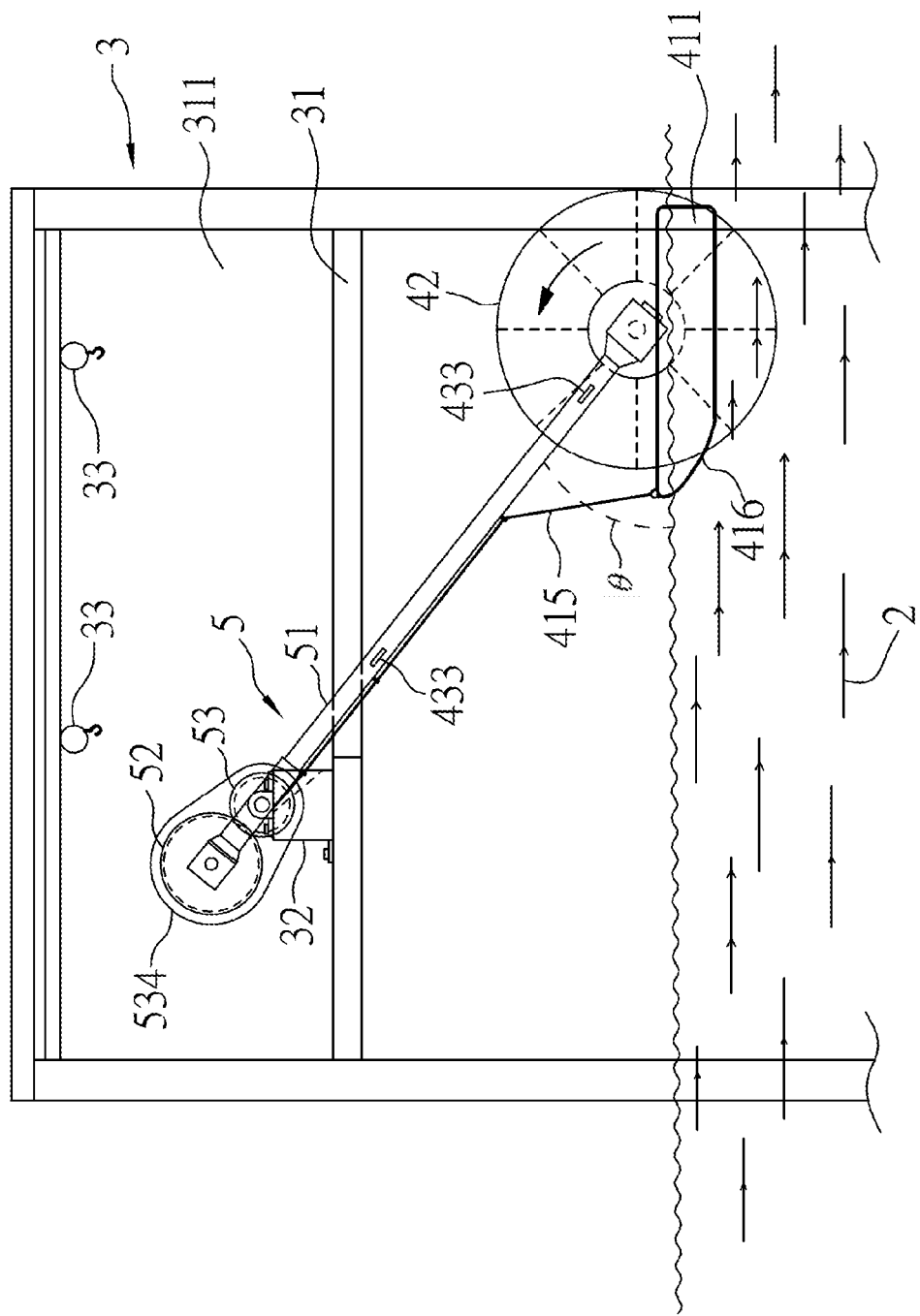
FIG. 4 is a cross-sectional view depicting a low water level state of a first preferred embodiment device according to an embodiment of the present invention.

With reference to FIGS. 2, 3 and 4, a first preferred embodiment device of present invention is provided. It can be disposed above a flow 2 in any onshore river, stream, dam or channel, and the flowing energy of the flow 2 is obtained and converted into electricity power, comprising a body unit 3, a water wheel unit 4, a mobile energy transmitting unit 5, and an electricity power generating unit 6.

The body unit 3 comprises a platform 31 by which a container 311 is surrounded and defined, and a holder 32 disposed on the platform 31. In the first preferred embodiment device of present invention, the platform 31 is built in determined distances above the flow 2, and the container 311 can be used as a power generation room, and in addition, it can also be built in the center of the flow 2. When the channel of the flow 2 is wide, plural present inventions can be disposed in horizontal to increase output; while the channel of the flow 2 is narrow, plural present inventions can also be dispose in vertical, so in practice, the suitable arrangement of electricity generating is adapted to the flow 2 situation.

The water wheel 4 is provided to obtain the energy of the flow 2, comprising a floating set 41, a water wheel set 42 and a supporting set 43. The floating set 41 is provided with a first floater 411, a second floater 412, a first indentation 413 disposed on the first floater 411, and a second indentation 414 disposed on the second floater 412. The first and second floaters 411, 412 can be buoyed up on the flow 2.

The separable water wheel set 42 is disposed on the floating set 41 and provided with a water wheel blade 421, a water wheel axis 422 locked on the water wheel blade 421, and a first gear wheel 423 locked with the water wheel axis 422.

The water wheel blade 421 is rotated via its contact with the flow 2 and the flushing of the flow 2, and moreover, the water wheel axis 422 and the first gear wheel 423 can be turned to rotate. The water wheel set 42 is disposed above the floater 41, and the water wheel blade 421 is buoyed up on water which is changed with the height of the water level.

Figure 5:
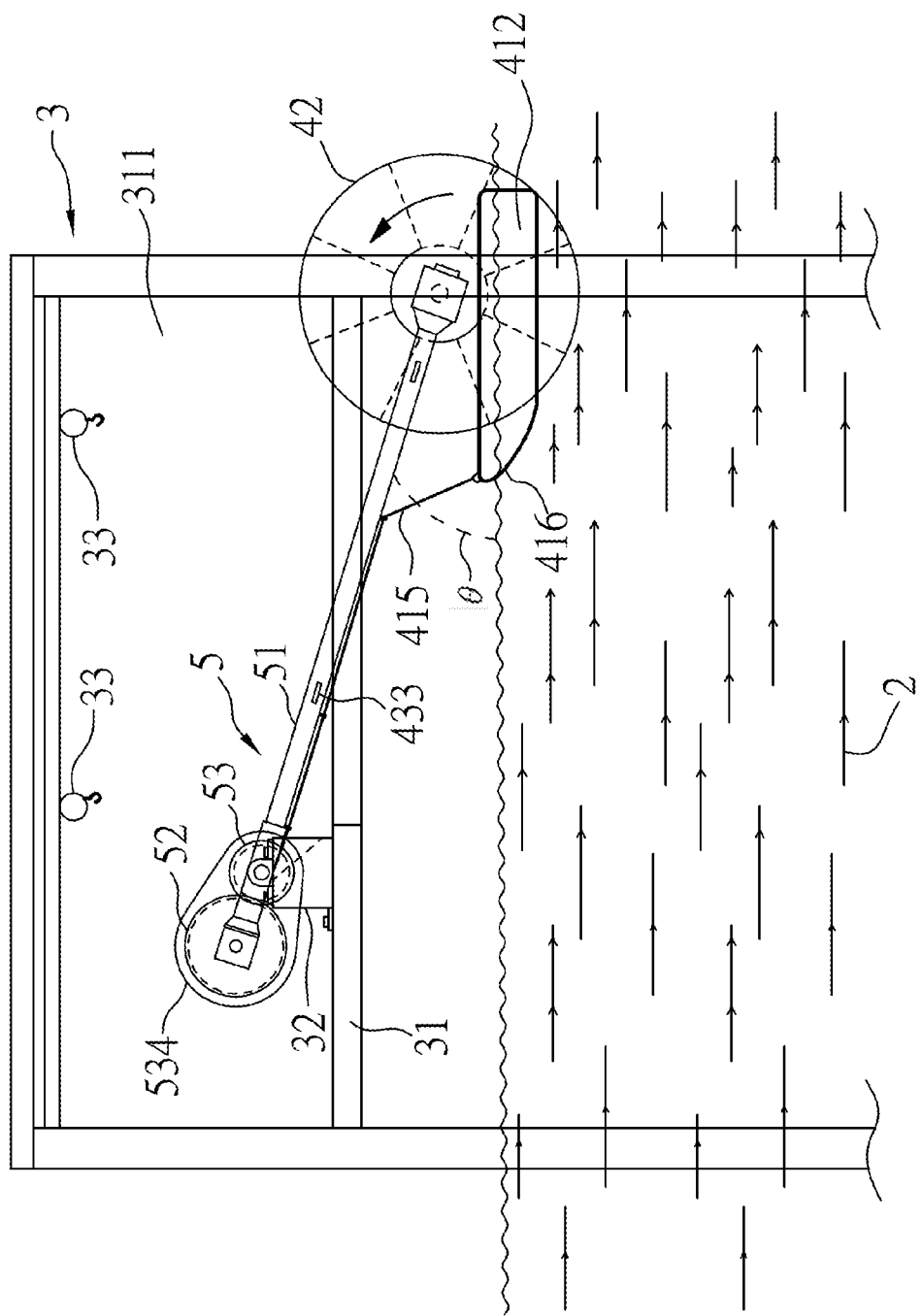
FIG. 5 is a cross-sectional view depicting a high water level state of a first preferred embodiment device according to an embodiment of the present invention.

With reference to FIGS. 3, 4 and 5, one end of the supporting set 43 is coupled to the water wheel set 42, and the opposing end is coupled to the holder 32. The supporting set 43 following the direction of the flow 2 is extended from the top of the holder 32 at a downward angle, and is formed an included angle θ with the surface of the flow 2. When the flow 2 is in high water level, the position of the water wheel set 42 on the water is rising, and the included angle θ becomes small; while the flow 2 is in low water level, the water wheel set 42 follows the declination of the water level, and the included angle θ becomes bigger. No matter the water wheel set is in high or low water level, by which the flushing of the flow 2 is obtained, so the water wheel blade 421 is turned to rotate.

In the first preferred embodiment device of present invention, the supporting set 43 is provided with a first supporting shaft 431, and a second supporting shaft 432. One end of the first and the second supporting shafts 431, 432 are disposed on the holder 32, the opposing ends are disposed next to both sides of the water wheel blade 421, and the first and the second supporting shafts 431, 432 are coupled to the water wheel axis 422 by bearing, so they are formed as a reverse U curve, so the water wheel blades 421 is turned to rotate by the flushing of the flow 2 obtained by the water wheel set 42. When in practice, it is possible that the water wheel set 42 can be coupled to only one supporting shaft, and it shall not be construed as limiting the present invention.

With reference to FIGS. 2 and 3, the mobile energy transmitting unit 5 comprises a first propeller set 51, a second propeller set 52, and a third propeller set 53. The first propeller set 51 is provided with a second gear wheel 511 meshed with the first gear wheel 423, a first axis locked with the second gear wheel 511 and vertical to the water wheel axis 422, a third gear wheel 513 locked with the first axis 512, and a first gear wheel box 514 to fix the first and the second gear wheels 423, 511. The surrounding of the first axis 512 is protected by a steel tube protection 515, and the second gear wheel 511, the first axis 512 and the third gear wheel 513 are turned to rotate by the first gear wheel 423. The steel tube protection 515 outside of the first axis 512 is disposed on the holder 32, when the first axis 512 is rotated inside the steel tube protection 515, it is moved simultaneously with the supporting set 43.

The second propeller set 52 is provided with a fourth gear wheel 521 meshed with the third gear wheel 513, a second axis 522 locked with the fourth gear wheel 521, a fifth gear wheel 523 locked with the second axis 522, and a second gear wheel box 524 to fix the third and fourth gear wheels 513, 521. The second axis 522 is vertical to the first axis 512 and parallel to the water wheel axis 422, and the fourth gear wheel 521, the second axis 522 and the fifth gear wheel 523 are turned to rotate by the third gear wheel 513. The water wheel set 42 has linkage with the second axis 522 via the first propeller set 51.

The third propeller set 53 is provided with a sixth gear wheel 531 meshed with the fifth gear wheel 523, a third axis 532 locked with the sixth gear wheel 531 and disposed on the holder 32, and an auxiliary shaft 533 to fix the fifth and sixth gear wheels 523, 531. In the first preferred embodiment device of present invention, the third axis 532 is parallel to the second axis 522 and vertical to the first axis 512, the sixth gear wheel 531 and the third axis 532 are turned to rotate by the fifth gear wheel 523. The outside of the fifth and the sixth gear wheels 523, 531 is provided with a protective casting 534 to avoid the users from being caught in the fifth and the sixth gear wheel 523, 531.

The first and the third propeller sets 51, 53 and the first and the second supporting shafts 431, 432 are lined up to be a line 7 (shown in dashed line in the figure). The line 7 is regarded as a fulcrum, and the leverage is provided by the first propeller set 51, so when the water wheel set 42 rises because of the flow 2, the second propeller set 52 lows; while the water wheel 42 lows because of the flow 2, the second propeller set 52 rises. The fifth gear wheel 523 of the second propeller set 52 has shifted rotation along the sixth gear wheel 531. Therefore, no matter the first propeller set 51 is in low or high water level, it can be meshed with the third propeller set 53, and the rotation energy of the water wheel unit 4 can be continuously transmitted to the electricity power generating unit 6.

The first, the second, the third and the fourth gear wheels 423, 511, 513 and 521 are umbrella-shaped, while the fifth and the sixth gear wheels 523, 531 are normal gear wheel. The rotation direction of the above umbrella-shaped gear wheels is changeable, and the rotational speed can be changed with gear ratio. The flow velocity of the flow 2 is usually not fast, but has large amount of energy, so the rotational speed of the water wheel blades 521 is either not fast. However, via the design of the above variable speed and direction gear wheels, the rotational speed of the third axis 532 can be improved.

The holder 32 is provided with a containing groove 321 by which the sixth gear wheel 531 is contained, a second containing groove 322 by which the first axis 512 is contained, a third containing groove 323 by which the first supporting shaft 431 is contained, and a fourth containing groove 324 by which the second supporting shaft 432 is contained. The sixth gear wheel 531, the first axis 512 and the first and the second supporting shafts 431, 432 are movable without obstruction of the holder 32 inside the first, the second, the third and the fourth containing grooves 321, 322, 323 and 324.

Figure 6:
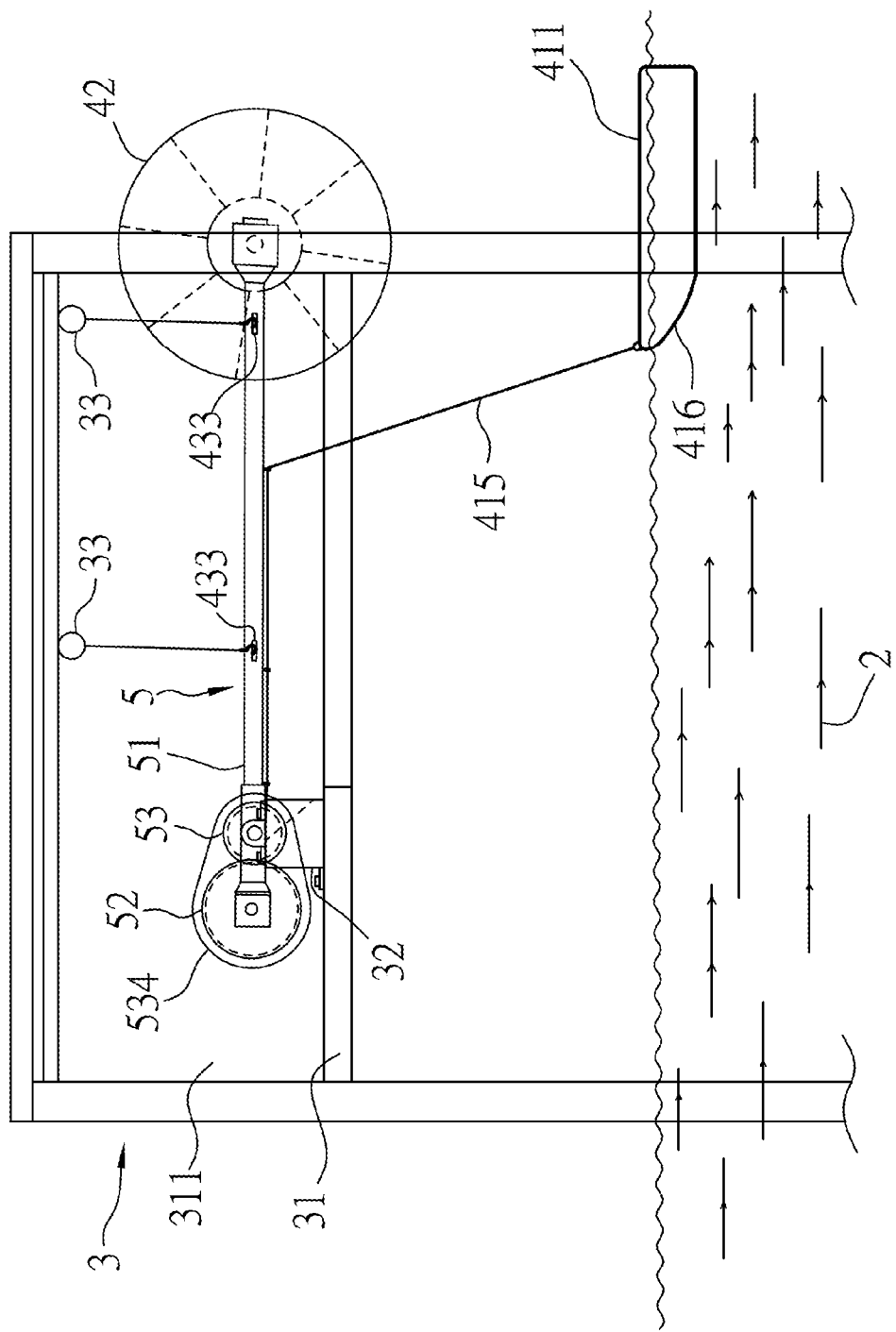
FIG. 6 is a cross-sectional view depicting an emergence state of a first preferred embodiment device according to an embodiment of the present invention.

With reference to FIGS. 4, 5 and 6, the electricity power generating unit 6 comprises a generator 61 disposed in the container 311, and is provided with a generator axis 611 locked with the third axis 532, and a clutch 612 disposed in the generator axis 611. The generator axis 611 is turned to rotate via the third axis 532 to generate electricity, and the rotation of the generator axis 611 is controlled by the clutch 612.

The body unit 3 further comprises plural cranes 33 disposed above the container 311, and the supporting set 43 further comprises plural hangers 433 disposed above the first and the second supporting shafts 431, 432. The first and the second supporting shafts 431, 432 are lifted up by the crane 33 when the hanger 433 moves, so the water wheel unit 4 is moved from the water to the platform 31 for convenience of maintenance.

The supporting set 43 is further provided with a first plate 434 disposed below the first supporting shaft 431, a second plate 435 disposed below the second supporting shaft 432, a first component 436 disposed below the first plate 434, and a second component 437 disposed below the second plate 435.

When the water wheel 42 is buoyed up on water, the first and the second plates 434, 435 are respectively disposed on the first and the second floater 411, 412, and the first component 436 is fitted to the first indention 413 to fix the first and the second floaters 411, 412 which are rotated on water carrying the water wheel blade 421. When the water wheel 42 is lifted up to leave the water, the first and the second plates 434, 435 are separated from the first and the second floaters 411, 412.

In the first preferred embodiment device of present invention, the floating set 41 further comprises two ropes 415 respectively disposed on the first and the second floaters 411, 412. The ropes 415 are attached to the first and the second supporting shafts 431, 432 and disposed on the holder 32, so the first and the second floaters 411, 412 is pulled by the ropes 415 to avoid being washed away by the flow 2. In which, the bottom edge of the first and the second floaters 411, 412 facing the direction of the flow 2 are formed as a boat shape 416, and it helps the flow 2 pass through the first and the second floaters 411, 412.

With reference to FIG. 4, depicting the state that the water wheel 42 is buoyed up on the flow 2 in low water level, the leverage caused by the first propeller set 51 with fulcrum of the holder 32 is provided by the second propeller set 52, and the included angle θ becomes large. The rotating energy of the water wheel set 42 is still able to be transmitted to the generator 61 by the mobile energy transmitting unit 5 for generating electricity.

With reference to FIG. 5, depicting the state that the water wheel 42 floats on the flow 2 in high water level, the leverage caused by the first propeller set 51 with fulcrum of the holder 32 is provided by the second propeller set 52, and the included angle θ becomes small. The rotating energy of the water wheel set 42 is still able to be transmitted to the generator 61 by the mobile energy transmitting unit 5 for generating electricity.

Two sets of generator 61 are able to be driven by the water wheel set 42 in the present invention, two mobile energy transmitting units 5 are necessary to be respectively disposed on the right and left sides of the water wheel set 42, so the energy of the flow 2 is transmitted to the platform 31, and then two generators 61 are respectively disposed for generating electricity.

Figure 7:
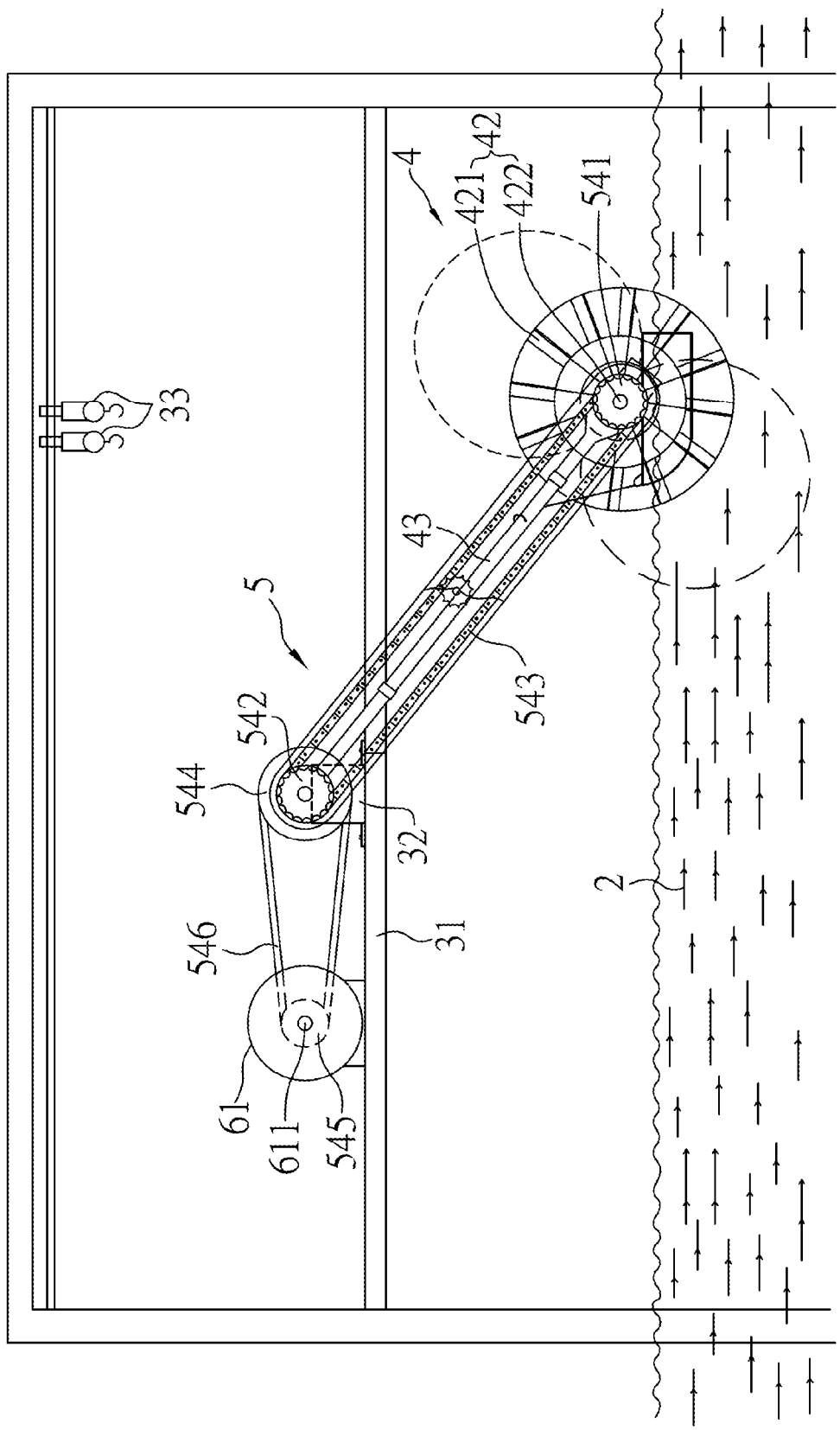
FIG. 7 is a cross-sectional view depicting a second preferred embodiment device according to an embodiment of the present invention.

With reference to FIG. 7, a second preferred embodiment device of present invention is provided. Because the second embodiment is similar to the first, common features are not described again. A difference is that the mobile energy transmitting unit 5 comprises a first propeller wheel 541 disposed in the water wheel axis 422, a second propeller wheel 542 disposed on the holder 32, a first propeller unit 543 coupled to the first and the second propeller wheels 541, 542, a third propeller wheel 544 disposed on the holder 32 and rotated simultaneously with the second propeller wheel 542, a fourth propeller wheel 545 disposed in the generator axis 611, and a second propeller unit 546 coupled to the third and the fourth propeller wheels 544, 545.

The first propeller wheel 541 is rotated simultaneously with the water wheel blade 421, the second and third propeller wheels 542, 544 are rotated simultaneously, and the fourth propeller wheel 545 is rotated simultaneously with the generator axis 611 of the generator 61. The circumference of the first and the second propeller wheels 541, 542 are encircled at the same time by the first propeller unit 543, so that the second propeller wheel 542 is rotated by obtaining the energy of the first propeller wheel 541. The circumference of the third and the fourth propeller wheels 544, 545 are encircled at the same time by the second propeller unit 546, so that the fourth propeller wheel 545 is rotated by obtaining the energy of the third propeller wheel 544.

When the water wheel unit 4 is turned to rotate by the flow 2, the energy of the flow 2 is transmitted to the generator 61 to generate electricity by the mobile energy transmitting unit 5. When in practice, the generator axis 611 of the generator 61 has a direct linkage with the second propeller wheel 542 to achieve the purpose of generating electricity without usage of the third and fourth propeller wheels 544, 545 and the second propeller unit 546.

In the second preferred embodiment device of present invention, the circumference of the first propeller wheel 541 is bigger than the second propeller wheel 542, while the circumference of the third propeller wheel 544 is bigger than the fourth propeller wheel 545, so that the rotational speed of the generator axis 611 can be risen up and the electricity generating frequency of the generator 61 can be speeded up. Preferably, the rotational speed of the first propeller wheel 541 is slow but with big torsion, the chain is used by the first propeller unit 543, and the gear wheel adapted to the first propeller unit 543 is used by the first and the second propeller wheels 541, 542. While the rotation speed of the generator axis 611 is faster, the continuous belt is used by the second propeller unit 546, so that the fourth propeller wheel 545 is turned to rotate via the third propeller wheel 544, and the amount of the continuous belt is determined by the energy. When in practice, the first and the second propeller units 543, 546 are optional adapted to different situations and it shall not be construed as limiting the invention.

In addition, the cross-section view of the water wheel blade 421 of the water wheel set 42 is a V shape, and the included angle of the V shape heads to the direction of the flow 2, so that the flowing force of the flow 2 can be focused on the water wheel blade 421. Preferably, the included angle of the V shape in every water wheel blade 421 is between 100° and 140°, so the maximum thrust of the flow 2 can be obtained. Furthermore, the retaining sheets can be disposed next to the both sides of the water wheel blade 421, so the thrust of the flow 2 can be accumulated efficiently.

With the description of foregoing preferred embodiments, the following benefits of the present invention can be obtained:

1. The floating set 41 is buoyed up on water, so that the water wheel unit 4 and the flow 2 are remained in contact state. No matter the flow 2 is in high or low water level, the water wheel blade 421 is able to be rotated by the flushing of the flow 2.

2. Following the previous description, the supporting set 43 following the direction of the flow 2 is extended at a downward angle, and an included angle θ is formed between the surface of the flow 2 and the supporting set 43, so that the water wheel blade 421 is rotated by the downstream flowing of the flow 2.

3. Because of the buoyance of the first and the second floaters 411, 412, the water wheel blade 421 is buoyed up on water, and moreover, the bottom of the first and the second floaters 411, 412 are designed as the boat shape 416. The first and the second floaters 411, 412 are pulled by the ropes 415, and their surfaces toward the direction of the flow 2 are designed as the boat shape 416, so that the flow 2 can be diverted to reduce the shaking of the water wheel blade 421 caused by turbulences.

4. The mobile energy transmitting unit 5 is rotated in a variable angle along the sixth gear wheel 531 by the fifth gear wheel 523 of the second propeller set 52. Therefore, no matter the first propeller set 51 is in low or high water level, it can be meshed with the third propeller set 53, and the rotation energy of the water wheel unit 4 can be continuously transmitted to the electricity power generating unit 6 for generating electricity.

In conclusion, with the present invention, the water wheel blade 421 is buoyed up on water via the floating set 41, and is rotated by obtaining the flushing of the flow 2, and moreover, the generator axis 611 is turned to rotate via the mobile energy transmitting unit 5 adapted to the water level, so that the generator 61 can generate electricity. The water wheel blade 421 is stabilized by the boat-shaped floating set 41 to obtain the energy of the flow 2, and is separable to be coupled to the floating set 41, so it can depart from the floating set 41 for maintenance, and be coupled to the floating set 41 when generating electricity. Therefore, the objectives of the present invention can be obtained.

The foregoing detailed description is merely in relation to two preferred embodiment devices of the present invention, and shall not be construed as limiting the invention. It is to be understood that many other possible modifications and variations can be made without departing from the spirit and scope of the invention as hereinafter claimed.

What is claimed is:

1. An onshore hydroelectric power generation device disposed above a flow to obtain and convert the energy of the flow into electricity, comprising:
    a body unit, including a platform disposed above the flow and a holder disposed on the platform;
    a water wheel unit, including a supporting set, a water wheel set coupled to the supporting set, and a floating set coupled to the supporting set and disposed below the water wheel set; the floating set is buoyed up on water and a position of the floating set is changed with height of water level, so the height of the water wheel set is supported, and the water wheel set is turned to rotate by the contact between the flow and water wheel set;
    a mobile energy transmitting unit, being coupled to the water wheel set and being adapted to the position of water wheel set; and
    an electricity power generating unit, comprising a generator disposed on the platform and coupled to the mobile energy transmitting unit,
    wherein the water wheel set is configured to be separated and disposed on the floating set, and provided with a water wheel blade, a water wheel axis locked on a water wheel blade, and a first gear wheel locked with the water wheel axis; the water wheel blade is rotated by obtaining the flow and the water wheel axis and the first gear wheel is turned to rotate; one end of the supporting set is coupled to the water wheel set, and an opposing end is coupled to the holder; the supporting set following an direction of the flow is extended from the top of the holder at a downward angle, and is formed an included angle with the surface of the flow, so that the water wheel blade is rotated by the water flushing obtained by the water wheel; the mobile energy transmitting unit comprises a first propeller set, a second propeller set, and a third propeller set; the first propeller set is provided with a second gear wheel meshed with the first gear wheel, a first axis locked with the second gear wheel, and a third gear wheel locked with the first axis; the second gear wheel, the first axis and the third gear wheel are turned to rotate by the first gear wheel, and the first axis is moved simultaneously with the supporting set; the second propeller set is provided with a fourth gear wheel meshed with the third gear wheel, a second axis locked with the fourth gear wheel, and a fifth gear wheel locked with the second axis; the fourth gear wheel, the second axis and the fifth gear wheel are turned to rotate by the third gear wheel; the third propeller set is provided with a sixth gear wheel meshed with the fifth gear wheel, and a third axis locked with the sixth gear wheel and disposed on the holder; the sixth gear wheel and the third axis are turned to rotate by the fifth gear wheel.

2. The device of claim 1, wherein the third propeller set further including an auxiliary shaft coupled to the fifth and sixth gear wheels which supports the fifth gear wheel is rotated based upon the sixth gear wheel as the center of a circle.

3. The device of claim 2, wherein the supporting set is provided with a first supporting shaft with one end disposed on the holder, and a second supporting shaft with one end disposed on the holder; the opposing ends of the first and the second supporting shafts are disposed next to both sides of the water wheel blade, and coupled to the water wheel axis.

4. The device of claim 3, wherein the supporting set further being provided with a first plate disposed below the first supporting shaft, a second plate disposed below the second supporting shaft, a first component disposed below the first plate, and a second component disposed below the second plate; the floating set is provided with a separable first floater disposed below the first plate, a separable second floater disposed below the first plate, a first indentation disposed on the first floater, a second indentation disposed on the second floater, and two ropes respectively disposed on the first and the second floaters; when the water wheel is buoyed up on water, the separable first and the second plates are disposed on the first and the second floater, and the first and the second components are fitted to the first and the second indentations, so the water wheel blade is not moved by the first and the second floater; when the water wheel leaves the water, the first and the second components of the first and the second plates are separated from the first and the second indentations of the first and the second floaters, the ropes are attached to the first and the second supporting shafts and locked on the holder, and the bottom edge of the first and the second floaters facing the direction of the flow formed as a boat shape.

* * * * *